United States Patent
Larkin, III et al.

(10) Patent No.: US 10,858,091 B2
(45) Date of Patent: Dec. 8, 2020

(54) HELICOPTER SKID LANDING GEAR

(71) Applicant: Bell Helicopter Textron Inc., Fort Worth, TX (US)

(72) Inventors: John C. Larkin, III, Bristol, TN (US); Emery N. Ward, Johnson City, TN (US); William P. Sumner, Kingsport, TN (US); Ricky Jenkins, Bluff City, TN (US); Brian Lafon, Johnson City, TN (US)

(73) Assignee: Bell Helicopter Textron Inc., Fort Worth, TX (US)

(*) Notice: Subject to any disclaimer, the term of this patent is extended or adjusted under 35 U.S.C. 154(b) by 293 days.

(21) Appl. No.: 16/047,907

(22) Filed: Jul. 27, 2018

(65) Prior Publication Data

US 2019/0047687 A1 Feb. 14, 2019

Related U.S. Application Data

(60) Provisional application No. 62/544,030, filed on Aug. 11, 2017.

(51) Int. Cl.
*B64C 25/52* (2006.01)
*B64C 25/32* (2006.01)

(52) U.S. Cl.
CPC ........ *B64C 25/52* (2013.01); *B64C 2025/325* (2013.01)

(58) Field of Classification Search
CPC ............... B64C 25/52; B64C 2025/325; E04C 2003/0447
See application file for complete search history.

(56) References Cited

U.S. PATENT DOCUMENTS

| | | |
|---|---|---|
| 2,641,423 A | 6/1953 | Harriman et al. |
| 3,195,738 A * | 7/1965 | Larkfeldt ............ F16L 1/09 414/746.8 |
| 3,716,208 A | 2/1973 | Fagan et al. |
| 3,888,436 A | 6/1975 | Sealey |
| 4,196,878 A | 4/1980 | Michel |
| 4,270,711 A | 6/1981 | Cresap et al. |
| 4,284,255 A | 8/1981 | Masclet et al. |
| 4,519,559 A | 5/1985 | Logan et al. |
| 4,558,837 A | 12/1985 | Mens et al. |
| 4,645,143 A | 2/1987 | Coffy |
| 5,211,359 A | 5/1993 | Rene et al. |
| 5,224,669 A | 7/1993 | Guimbal |

(Continued)

*Primary Examiner* — Joseph W Sanderson
(74) *Attorney, Agent, or Firm* — Timmer Law Group, PLLC

(57) ABSTRACT

In a first aspect, there is a helicopter skid landing gear assembly including a front cross tube configured to interconnect two skid tubes; and a rear cross tube configured to interconnect two skid tubes; wherein at least one of the cross tubes comprises a monolithic metallic tube having a cross-section with a round exterior shape and an elliptical hollow portion therein. In a second aspect, there is a method for retrofitting a helicopter with a landing gear assembly; the method including providing a front cross tube and a rear cross tube, at least one of the front cross tube and the rear cross tube comprises a monolithic metallic tube having a cross-section with a substantially round exterior shape and an elliptical hollow portion therein; and connecting the front cross tube and rear cross tube to a fuselage.

19 Claims, 4 Drawing Sheets

(56) References Cited

U.S. PATENT DOCUMENTS

| | | | |
|---|---|---|---|
| 5,462,242 | A | 10/1995 | Collins et al. |
| 5,735,484 | A | 4/1998 | Bradley |
| 6,244,538 | B1 | 6/2001 | Howard et al. |
| 6,427,942 | B2 | 8/2002 | Howard et al. |
| 8,209,834 | B2 * | 7/2012 | Mons ............... F01D 5/085 29/281.1 |
| 8,919,694 | B2 | 12/2014 | Amante et al. |
| 9,599,256 | B2 * | 3/2017 | Konno ............... F16L 11/127 |
| 9,994,308 | B2 * | 6/2018 | Bernier ............... B21D 53/92 |
| 2002/0008175 | A1 * | 1/2002 | Howard ............... B64C 25/52 244/17.17 |
| 2007/0283562 | A1 | 12/2007 | Weise et al. |
| 2014/0224928 | A1 | 8/2014 | Bernier et al. |
| 2016/0040805 | A1 * | 2/2016 | Konno ............... F16L 11/127 138/129 |

* cited by examiner

HELICOPTER SKID LANDING GEAR

CROSS-REFERENCE TO RELATED APPLICATION

This application claims priority to U.S. Patent Application No. 62/544,030, filed Aug. 11, 2017, which is incorporated herein by reference in its entirety.

BACKGROUND

Technical Field

The present disclosure relates to aircrafts and, more particularly, to skid landing gear for a rotorcraft.

Description of Related Art

Helicopters, and particularly small and medium helicopters, may be equipped with a skid type landing gear. Conventional skid landing gear systems generally include two longitudinal skid tubes for contacting the ground and two cross tubes connecting the skid tubes to the body of the helicopter, although alternate designs are also possible.

Skid landing gear systems are generally designed with consideration of energy absorption during hard landings, stress levels in normal landings which should be low enough to ensure a satisfactory fatigue life, and an appropriate stiffness to avoid critical ground resonance modes. Moreover, skid landing gear systems are designed to maximize fatigue life during normal rotorcraft operations.

Conventional cross tubes typically have a circular or rectangular constant cross-section to facilitate bending to a desired shape. A cross-sectional view of an exemplary prior art cross tube 42 is shown in FIG. 4. A conventional prior art cross tube 42 has a circular cross section 44 with uniform thickness T, which defines a circular hollow portion 46 therein. Conventional cross tubes can be susceptible to cracks or other damage due to relatively high stresses incurred during landing operations.

There is a need for an improved landing gear assembly for a rotorcraft.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of landing gear assemblies and methods for mounting thereof are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

Figure 1:
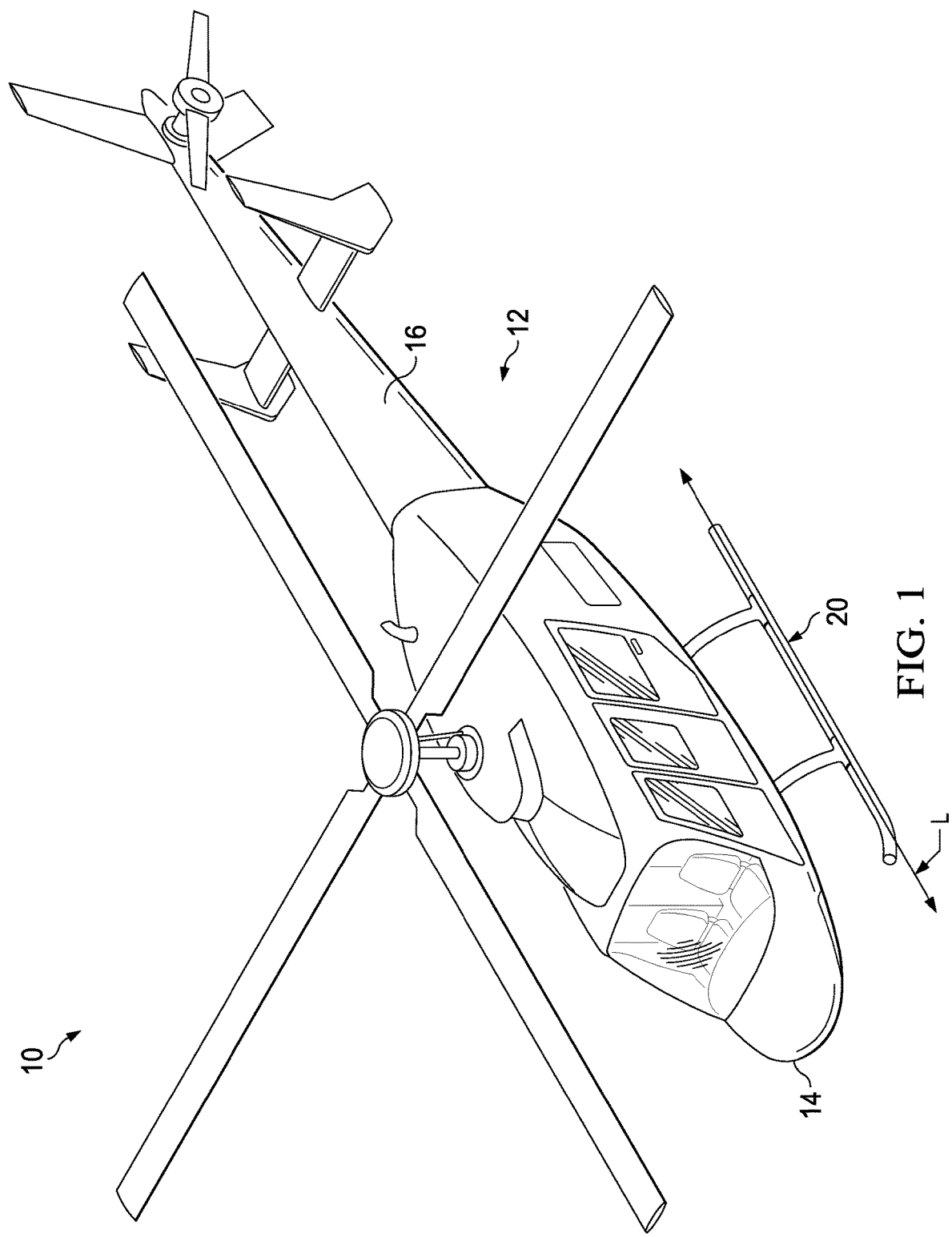
FIG. 1 is a schematic tridimensional view of a helicopter.

Referring now to FIG. 1, a helicopter 10 is generally shown. The helicopter 10 includes a fuselage 12 having a cabin portion 14 and a tail boom 16. The helicopter 10 is powered by one or more engines, a propulsion system such as a rotor system, and a flight control system. A landing gear assembly 20 is attached to a bottom portion of the fuselage 12.

Figure 2:
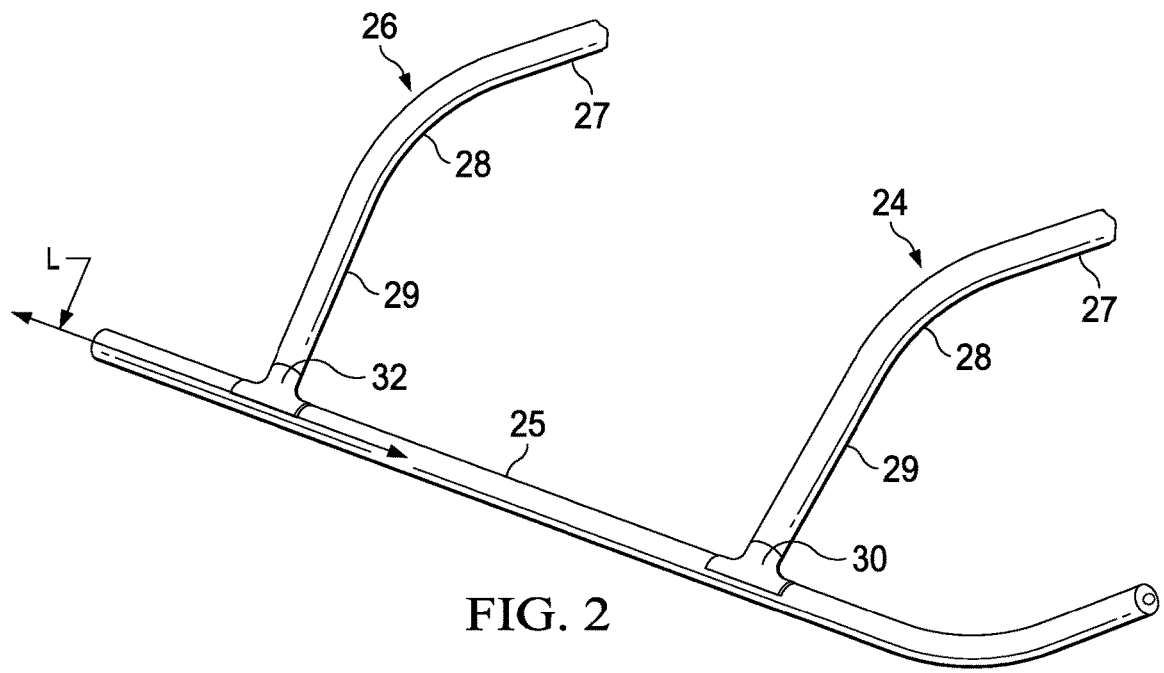
FIG. 2 is a schematic tridimensional view of part of a skid landing gear in accordance with a particular embodiment, which can be used on a helicopter such as that shown in FIG. 1.

Referring to FIG. 2, in a particular embodiment, the landing gear assembly 20 (only half of which is shown) is formed of structural tubes including two longitudinal skid tubes 25 (only one of which is shown) for contact with the ground, and front and rear cross tubes 24, 26 configured to interconnect the skid tubes 25. A longitudinal direction can be defined along the ground contact portion of one of the skid tubes 25; when the helicopter rests on a horizontal ground surface, the longitudinal axis L is thus horizontal. The front and rear cross tubes 24, 26 are attached to the fuselage by fittings (not shown), which are external or internal to the fuselage 12.

Each of the front and rear cross tubes 24, 26 includes a central portion 27 and a lateral portion 29. The central portion 27 is substantially straight and connected with the lateral portion 29 at bend 28. The lateral portion 29 is also substantially straight. A first end 22a and a second end 22b of each front and rear cross tube 24, 26 are configured to be connected with a respective saddle member (e.g., front saddle member 30 is shown connected to first and second ends 22a, 22b front cross tube 24 in FIG. 3). It should be appreciated that the front and rear cross tubes 24, 26 may take on a wide variety of configurations. For example, but not limitation, at least one of the central portion 27 and the lateral portion 29 can be curved.

Figure 3:
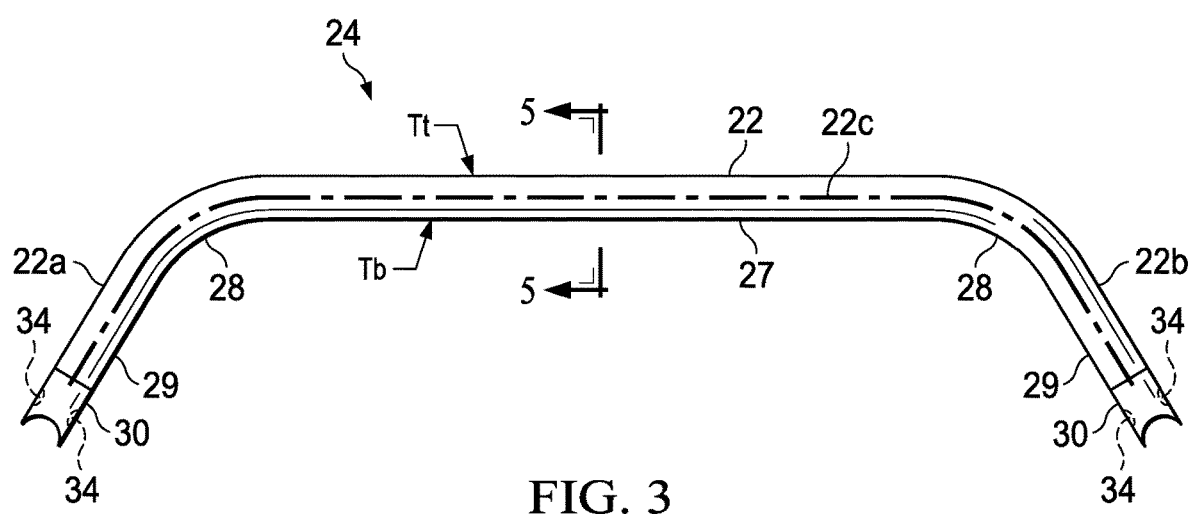
FIG. 3 is a front view of a front cross tube.
Figure 5:
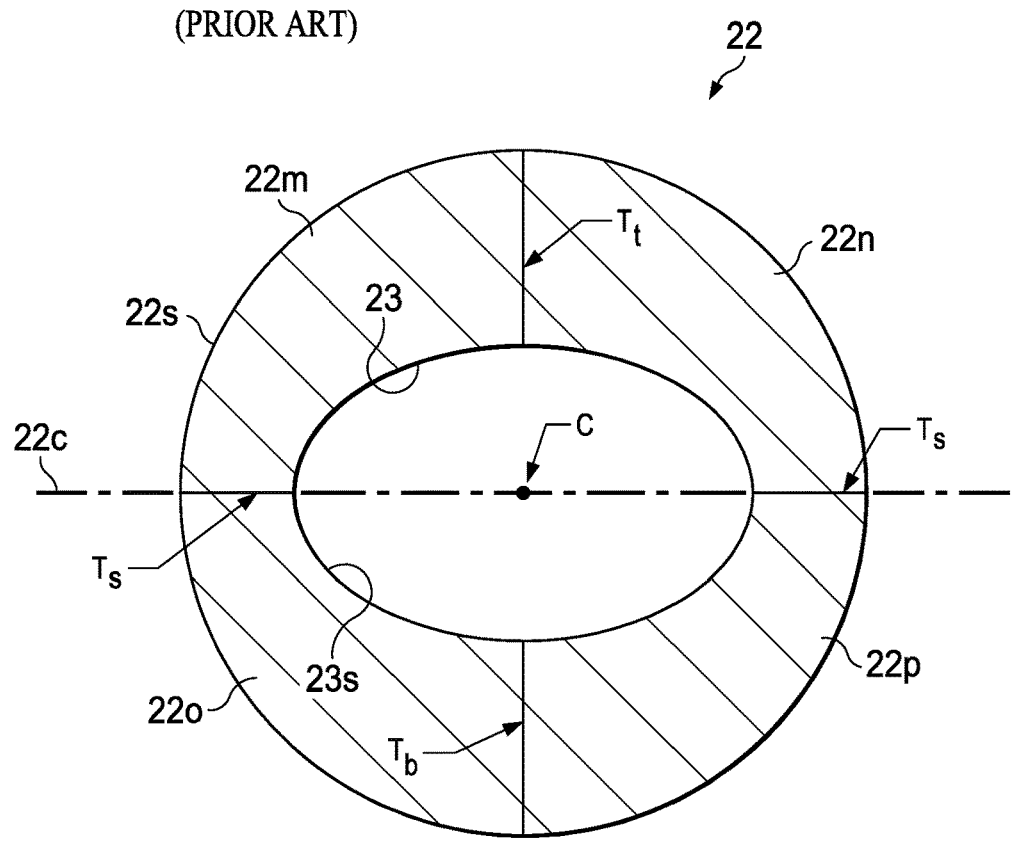
FIGS. 5-6 are cross-sectional views of a cross tube, taken from section lines 5-5 in FIG. 3, according to an illustrative embodiment.
Figure 6:
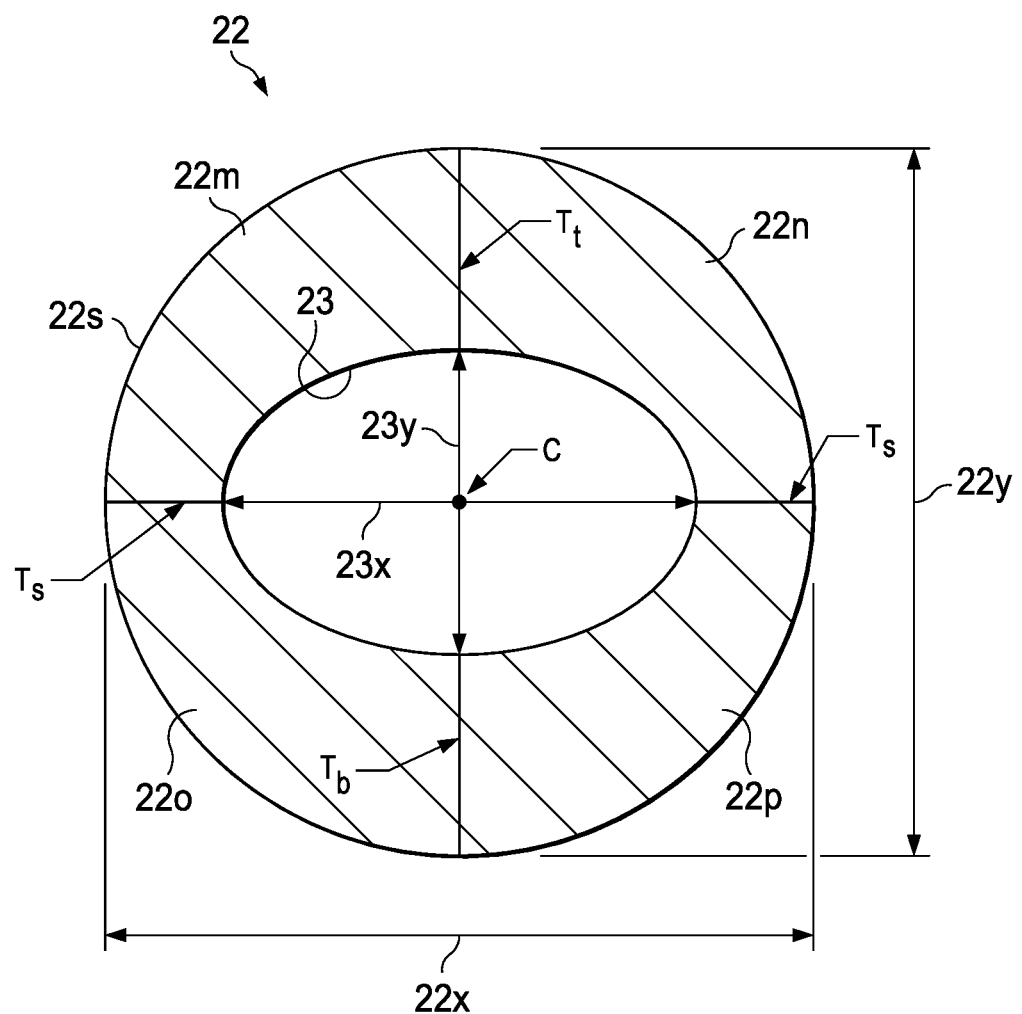

The front and rear cross tubes 24, 26 are each made of a cross tube 22 as described herein and shown in FIGS. 3 and 5-6. The cross tube 22 is made of a metal, such as aluminum or steel. The cross tube 22 is monolithic, i.e. made from a single continuous metallic tube from the first end 22a to the second end 22b having the desired shape as described herein. Advantageously, the monolithic metallic tube is free from composites, composite fibers, and composite particles, which can be expensive and labor intensive to manufacture.

The cross tube 22 is configured with an elliptical hollow portion 23 along the length of the cross tube 22. FIG. 3 illustrates a centerline 22c between top and bottom portions $T_t$ and $T_b$ of the cross tube 22. In some embodiments, the center C of the elliptical hollow portion 23 is aligned with the centerline 22c of the cross tube 22 such that the elliptical hollow portion 23 can be an elliptical hollow center portion.

Referring to FIGS. 5-6, cross-sectional views through the cross tube 22 are illustrated. The cross-section of FIGS. 5-6 is continuous along the cross tube 22 from the first end 22a to the second end 22b. The cross-sectional shape of the exterior surface 22s of cross tube 22 is substantially round. In particular, the exterior surface 22s is a circumference consisting of points equidistant from the center C of the cross-sectional shape of the cross tube 22 such that a horizontal axis 22x and a vertical axis 22y have the same length. In a preferred embodiment, the outer diameter of cross tube 22 is similar or identical to a conventional cross tube 42, which permits mounting and/or retrofitting of cross tube 22 using conventional landing gear components.

One of the unique features of the landing gear 20 is the cross tube 22 includes an elliptical hollow portion 23 extending therein as shown in FIGS. 5-6. In an embodiment, the cross-sectional shape of an interior surface 23s of the hollow portion 23 is substantially an ellipse such that a major axis 23x is not equal to a minor axis 23y. In the preferred embodiment, the major axis 23x is substantially horizontal and aligned with the centerline 22c of the cross tube 22. In an embodiment, the major axis 23x of the elliptical hollow portion 23 is disposed at the centerline 22c of the cross tube 22. The minor axis 23y of the elliptical hollow portion 23 is substantially vertical (e.g., substantially perpendicular to the centerline 22c). In an embodiment, the major axis 23x is longer than the minor axis 23y. The interior surface 23s of the hollow portion 23 is an elliptical shape that is not round.

The interior surface 23s of the elliptical hollow portion 23 is smooth (e.g., grooveless and ridgeless). The smooth surface 23s of the elliptical hollow portion 23 advantageously facilitates manufacture by extrusion and eliminates any internal machining steps.

Since the interior surface 23 of the elliptical hollow portion 23 is dissimilar in shape from the round shape of the exterior surface 22s, the thickness therebetween varies, as shown in FIGS. 5-6. In an embodiment, cross tube 22 has a cross-section that can be defined as a first upper quadrant 22m, a second upper quadrant 22n, a first lower quadrant 22o, and a second lower quadrant 22p.

In an embodiment, the thickness at the top and bottom portions $T_t$ and $T_b$ of the cross tube 22 are the same, wherein the thickness at $T_t$ and $T_b$ is each the thickest portion of the top and bottom portions, respectively. The thickness at $T_t$ is at the junction of the first and second upper quadrants 22m, 22n. The thickness at $T_b$ is at the junction of the first and second lower quadrants 22o, 22p. Each first and second upper and lower quadrants 22m-p has a varying thickness that tapers and decreases from the top and bottom thickness $T_t$, $T_b$, respectively, until reaching the side thickness $T_s$. In an embodiment, the thickness at the top and bottom portions $T_t$, $T_b$ aligns with the minor axis 23y and the side thickness $T_s$ aligns with the major axis 23x.

Figure 4:
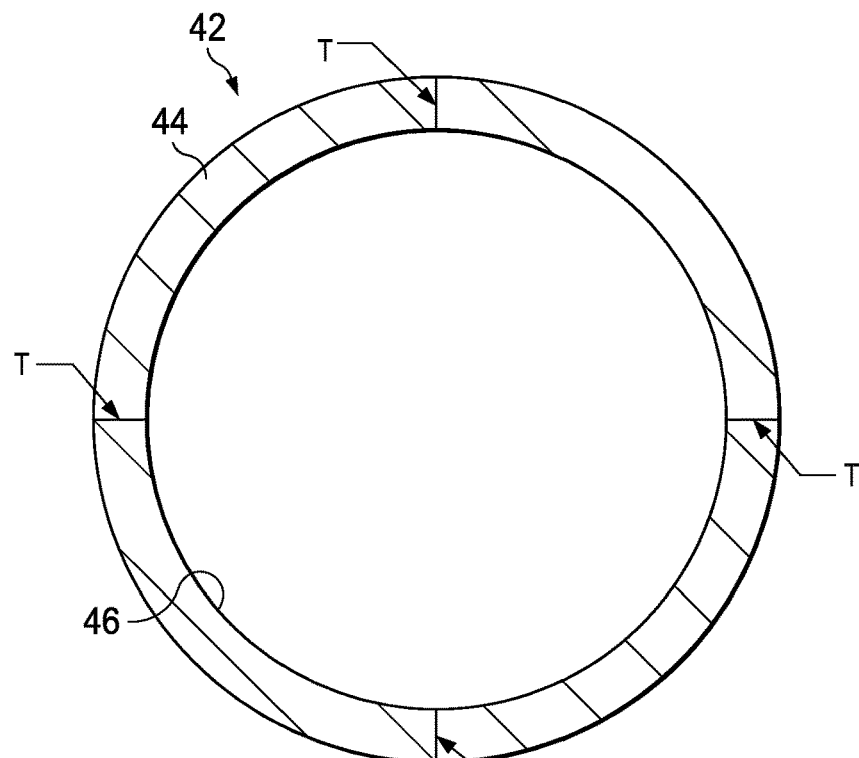
FIG. 4 is a cross-sectional view of a prior art cross tube.

In an embodiment, the thickness at the top and bottom portions $T_t$, $T_b$ of the cross tube 22 are not equal to and greater than the thickness at the sides $T_s$. In an embodiment, the thickness at the sides $T_s$ is greater than the thickness T of a conventional cross tube having a circular cross section 44 as shown in FIG. 4. In some embodiments, the thickness at the sides $T_s$ is equal to and can even be less than the thickness T of conventional cross tubes. In some embodiments, the thickness of the top and bottom portions $T_t$, $T_b$, relative to $T_s$ can vary in different locations in the central and lateral portions 27, 29, while still defining the elliptical hollow portion 23 therein.

Since the cross tube 22 configured in accordance with the above disclosure includes a substantially round exterior surface, the cross tube 22 can be assembled onto a rotorcraft as part of a landing gear assembly and/or retrofitted onto existing landing gear assemblies in a simplified, low cost manner. In one embodiment, front and rear saddle members 30, 32 connects each of the skid tubes 25 to the front and rear cross tubes 24, 26, respectively. Each of the saddle members 30, 32 can include at least one mounting aperture that is aligned with corresponding mounting apertures 34 in the lateral portion 29 of front and rear cross tubes 24, 26. Conventional fasteners (e.g., screws, bolts, etc.) can be used to secure the saddle members 30, 32 to the front and rear cross tubes 24, 26. In some embodiments, there are one, two, three, four, or more mounting apertures 34 disposed on the cross tubes 24, 26 that align with mounting apertures in the respective saddle member 30, 32. In some embodiments, the cross tubes 24, 26 are connected to the saddle members 30, 32 in a thicker portion of the cross tube 22 (e.g., in areas not located at the side thickness $T_s$). Due to loads experienced by the saddle members 30, 32, the alignment of the conventional fasteners to the thickest portions of the cross tube 22 adds strength and durability to the landing gear assembly 20. In some embodiments, mounting apertures 34 in the cross tubes 24, 26 are disposed generally at and/or adjacent to the top and bottom portions $T_t$, $T_b$.

The landing gear assembly and methods detailed above provide numerous advantages including at least one of the following: (1) improved strength capabilities as compared to conventional cross tubes; (2) improved fatigue life as compared to conventional cross tubes; (3) simplified manufacture of an extruded tube having the shape profile as described herein; (4) facilitates bending of the cross tubes to the desired shape; and (5) facilitates mounting and/or retrofitting the cross tubes to conventional saddle members since the cross tubes detailed herein have a round, conventional outer shape and diameter.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art.

Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A helicopter skid landing gear assembly comprising:
   a front cross tube configured to interconnect two skid tubes; and
   a rear cross tube configured to interconnect two skid tubes;
   wherein at least one of the cross tubes comprises a monolithic metallic tube having a cross-section with a round exterior shape and an elliptical hollow portion therein.

2. The helicopter skid landing gear assembly according to claim 1, wherein the monolithic metallic tube has a centerline between a top and a bottom portion thereof and the elliptical hollow portion comprises a major axis and a minor axis.

3. The helicopter skid landing gear assembly according to claim 2, wherein the major axis is aligned with the centerline.

4. The helicopter skid landing gear assembly according to claim 2, wherein the minor axis is perpendicular to the centerline.

5. The helicopter skid landing gear assembly according to claim 1, wherein the monolithic metallic tube comprises an exterior surface and an interior surface, the interior surface is smooth.

6. The helicopter skid landing gear assembly according to claim 1, wherein the monolithic metallic tube comprises a top portion, a bottom portion, and a pair of sides, and wherein the top and bottom portions have a thickness greater than the thickness at the pair of sides.

7. The helicopter skid landing gear assembly according to claim 6, further comprising an aperture disposed in at least one of the top portion or the bottom portion of the monolithic metallic tube.

8. A method for retrofitting a helicopter with a landing gear assembly; the method comprising:
   providing a front cross tube and a rear cross tube, at least one of the front cross tube and the rear cross tube comprises a monolithic metallic tube having a cross-section with a substantially round exterior shape and an elliptical hollow portion therein; and
   connecting the front cross tube and rear cross tube to a fuselage.

9. The method according to claim 8, wherein the monolithic metallic tube has a centerline between a top and a bottom portion thereof and the elliptical hollow portion comprises a major axis and a minor axis.

10. The method according to claim 9, wherein the major axis is aligned with the centerline.

11. The method according to claim 9, wherein the minor axis is perpendicular to the centerline.

12. The method according to claim 8, wherein the monolithic metallic tube comprises an exterior surface and an interior surface, the interior surface is smooth.

13. The method according to claim 8, wherein the monolithic metallic tube comprises a top portion, a bottom portion, and a pair of sides, and wherein the top and bottom portions have a thickness greater than the thickness at the pair of sides.

14. The method according to claim 13, further comprising an aperture disposed in at least one of the top portion or the bottom portion of the monolithic metallic tube.

15. A helicopter skid landing gear assembly comprising:
   a front cross tube configured to interconnect two skid tubes; and
   a rear cross tube configured to interconnect two skid tubes;
   wherein at least one of the cross tubes comprises a monolithic metallic tube having a cross-section with a round exterior shape and an elliptical hollow portion therein;
   wherein the monolithic metallic tube has a centerline between a top and a bottom portion thereof and the elliptical hollow portion comprises a major axis and a minor axis, the major axis is aligned with the centerline.

16. The helicopter skid landing gear assembly according to claim 15, wherein the minor axis is perpendicular to the centerline.

17. The helicopter skid landing gear assembly according to claim 15, wherein the monolithic metallic tube comprises an exterior surface and an interior surface, the interior surface is smooth.

18. The helicopter skid landing gear assembly according to claim 17, wherein the monolithic metallic tube comprises a top portion, a bottom portion, and a pair of sides, and wherein the top and bottom portions have a thickness greater than the thickness at the pair of sides.

19. The helicopter skid landing gear assembly according to claim 18, further comprising an aperture disposed in at least one of the top portion or the bottom portion of the monolithic metallic tube.

\* \* \* \* \*